(12) United States Patent
Liao

(10) Patent No.: US 10,167,911 B2
(45) Date of Patent: Jan. 1, 2019

(54) ELECTRIC PARKING BRAKE

(71) Applicant: Chih-Hsien Liao, Taichung (TW)

(72) Inventor: Chih-Hsien Liao, Taichung (TW)

(*) Notice: Subject to any disclaimer, the term of this patent is extended or adjusted under 35 U.S.C. 154(b) by 0 days.

(21) Appl. No.: 15/479,806

(22) Filed: Apr. 5, 2017

(65) Prior Publication Data

US 2017/0335908 A1 Nov. 23, 2017

(30) Foreign Application Priority Data

May 20, 2016 (TW) .............................. 105115665 A

(51) Int. Cl.
| | |
|---|---|
| *F16D 65/14* | (2006.01) |
| *F16D 55/2265* | (2006.01) |
| *F16D 55/227* | (2006.01) |
| *B60T 13/74* | (2006.01) |
| *F16D 55/226* | (2006.01) |
| *F16D 65/00* | (2006.01) |
| *F16D 65/18* | (2006.01) |
| *F16D 121/24* | (2012.01) |
| *F16D 125/40* | (2012.01) |

(52) U.S. Cl.
CPC ........ *F16D 55/2265* (2013.01); *B60T 13/741* (2013.01); *F16D 55/226* (2013.01); *F16D 55/227* (2013.01); *F16D 65/0087* (2013.01); *F16D 65/18* (2013.01); *F16D 65/183* (2013.01); *F16D 2121/24* (2013.01); *F16D 2125/40* (2013.01)

(58) Field of Classification Search
CPC .. F16D 2121/24; F16D 55/228; F16D 55/227; F16D 55/2265
See application file for complete search history.

(56) References Cited

U.S. PATENT DOCUMENTS

| | | | | |
|---|---|---|---|---|
| 5,188,202 | A | * | 2/1993 | Terashima .............. B60T 1/065 188/73.32 |
| 5,467,848 | A | * | 11/1995 | Knez ................. F16D 55/22655 188/73.31 |
| 2015/0001010 | A1 | * | 1/2015 | Liao ...................... B60T 13/741 188/72.3 |
| 2015/0267767 | A1 | * | 9/2015 | Liao ...................... B60T 13/741 188/72.1 |
| 2017/0130788 | A1 | * | 5/2017 | Noguchi ............... F16D 55/228 |
| 2018/0031060 | A1 | * | 2/2018 | Huang .................. F16D 55/227 |

FOREIGN PATENT DOCUMENTS

WO    WO-2017032988 A1 *  3/2017  ........... F16D 55/228

* cited by examiner

*Primary Examiner* — Nicholas J Lane
(74) *Attorney, Agent, or Firm* — Trop, Pruner & Hu, P.C.

(57) ABSTRACT

An electric parking brake includes a driving shaft, an actuator, first and second braking members, and first and second linings. The driving shaft has a threaded portion threadedly engaging the first braking member such that, through operation of the actuator, the first lining is driven by the first braking member to move toward a side surface of a brake disk in a direction to thereby move the second braking member to move toward an opposite side surface of the brake disk in an opposite direction, so that the first and second linings are moved toward each other to clamp the brake disk therebetween.

4 Claims, 7 Drawing Sheets

ELECTRIC PARKING BRAKE

CROSS-REFERENCE TO RELATED APPLICATION

This application claims priority of Taiwanese Patent Application No. 105115665, filed on May 20, 2016.

FIELD

The disclosure relates to a parking brake, and more particularly to an electric parking brake.

BACKGROUND

A conventional electric parking brake disclosed in Taiwanese Patent Publication No. 201531632 includes a main body unit, a lining unit, a braking unit and an actuating unit. The braking unit includes a first braking member, a second braking member, and a connecting member connected to the second braking member. The actuating unit includes a support connected to the connecting member, an actuator connected to the support, and a driving shaft driven by the actuator and driving the first braking member. During a parking operation, the driving shaft drives the first and second braking members to move toward each other such that, the lining unit is driven to clamp a brake disk.

However, during the parking operation, the second braking member of the braking unit has multiple degrees of freedom relative to the main body unit, and thus may be easily lifted up when braking suddenly. As a result, the parking stability of the conventional electric parking brake is influenced.

SUMMARY

Therefore, the object of the disclosure is to provide an electric parking brake that has better parking stability.

According to the disclosure, the electric parking brake is adapted for use with a brake disk. The brake disk has a rotating axis, and opposite first and second side surfaces perpendicular to the rotating axis. The electric parking brake includes a main body unit, a lining unit, a braking unit and an actuating unit. The main body unit includes first and second side seats adapted to be located respectively at two sides of the brake disk, and adapted to be adjacent respectively to the first and second side surfaces, and a pair of elongate guiding members spaced apart from each other, and connected between the first and second side seats. The first side seat has a first recess adapted to be disposed in proximity to the first side surface. The second side seat has a second recess adapted to be disposed in proximity to the second side surface. The first and second recesses cooperate to form an accommodating space between the first and second side seats. The guiding members extend parallel to the rotating axis and through the accommodating space. The lining unit includes a first positioning member movable in the first recess along a central axis which is parallel to the rotating axis, a first lining secured on the first positioning member, a second positioning member movable in the second recess along the central axis, and a second lining secured on the second positioning member. The first and second linings are adapted to be adjacent respectively to the first and second side surfaces. The braking unit includes a first braking member movable in the first recess along the central axis, a second braking member movable in the second recess along the central axis, and a connecting member having opposite side edges, and a pair of hollow sliding portions that are disposed respectively on the side edges, and that are respectively and movably sleeved on the guiding members. The actuating unit includes a support fixedly connected to the connecting member, an actuator mounted on the support, and a driving shaft extending along the central axis, and rotated by the actuator to move the first braking member relative to the main body unit. The driving shaft has a threaded portion threadedly engaging the first braking member such that, through operation of the actuator, the first lining is driven by the first braking member to move toward the first side surface in a direction to thereby move the second braking member toward the second side surface in an opposite direction, so that the first and second linings are moved toward each other to clamp the brake disk therebetween.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
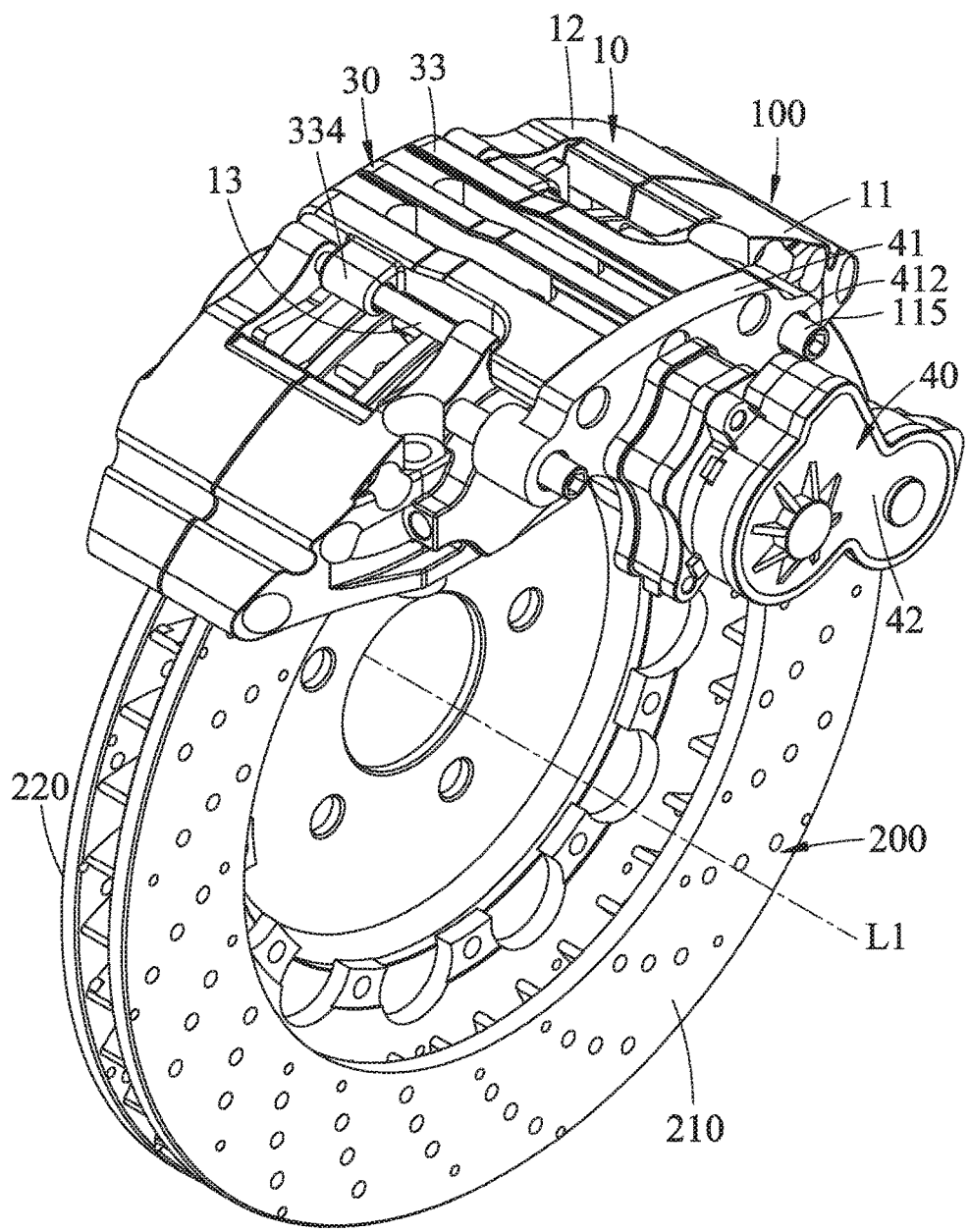
FIG. 1 is a perspective view of an embodiment of an electric parking brake according to the disclosure, illustrating that the electric parking brake is mounted to a brake disk.

Referring to FIGS. 1 to 4, the embodiment of an electric parking brake 100 according to the disclosure is adapted for use with a brake disk 200. The brake disk 200 has a rotating axis (L1), and opposite first and second side surfaces 210, 220 perpendicular to the rotating axis (L1). The electric parking brake 100 includes a main body unit 10, a lining unit 20, a braking unit 30 and an actuating unit 40.

The main body unit 10 includes first and second side seats 11, 12 adapted to be located respectively at two sides of the brake disk 200, and adapted to be adjacent respectively to the first and second side surfaces 210, 220, and a pair of elongate guiding members 13 spaced apart from each other, and connected between the first and second side seats 11, 12. The first side seat 11 has a first recess 111 adapted to be disposed in proximity to the first side surface 210, a shaft hole 112 extending through the first side seat 11 along a central axis (L2) which is parallel to the rotating axis (L1), and communicated with the first recess 111, a pair of first lugs 113 disposed on a top portion of the first side seat 11, and fixedly and respectively connected to the guiding members 13, and a pair of guide rods 115 extending from the first side seat 11 and parallel to the rotating axis (L1), and extending away from the first recess 111. Each of the first lugs 113 has a threaded hole 114.

The second side seat 12 has a second recess 121 adapted to be disposed in proximity to the second side surface 220, a counterbore 122 having a wide section 122W that is communicated with the second recess 121, and a narrow section 122N that is narrower than the wide section 122W, and that extends along the central axis (L2) a pair of second lugs 124 disposed on a top portion of the second side seat 12, and fixedly and respectively connected to the guiding members 13. Each of the second lugs 124 has a counterbore 125. The first and second recesses 111, 121 cooperate to form an accommodating space 14 between the first and second side seats 11, 12.

The guiding members 13 extend parallel to the rotating axis (L1) and through the accommodating space 14. Each of the guiding members 13 has a first guiding end 131 connected to the first side seat 11, a second guiding end 133 opposite to the first guiding end 131, and connected to the second side seat 12, a threaded section 132 disposed at the first guiding end 131, and a head section 134 disposed at the second guiding end 133. The threaded sections 132 of the guiding members 13 are respectively and threadedly engaged to the threaded holes 114 of the first lugs 113 of the first side seat 11. The head sections 134 of the guiding members 13 are respectively disposed in the counterbores 125 of the second lugs 124 of the second side seat 12.

The lining unit 20 includes a first positioning member 21 movable in the first recess 111 along the central axis (L2), a first lining 22 secured on the first positioning member 21, a second positioning member 23 movable in the second recess 121 along the central axis (L2), and a second lining 24 secured on the second positioning member 23. The first and second linings 23, 24 are adapted to be adjacent respectively to the first and second side surfaces 210, 220.

The braking unit 30 includes a first braking member 31 movable in the first recess 111 of the first side seat 11 along the central axis (L2), a second braking member 32 movable in the second recess 121 of the second side seat 12 along the central axis (L2), and a connecting member (33) connected to the second braking member 32, and extending along the central axis (12). The first braking member 31 is disposed between the first side seat 11 and the first positioning member 21, and has an extension tube portion 311 disposed in the shaft hole 112 of the first side seat 11, extending along the central axis (L2), and having a threaded hole 312. The second braking member 32 is disposed between the second side seat. 12 and the second positioning member 23, is movable in the counterbore 122 of the second side seat 12 along the central axis (L2), and has a protruding rod 321 disposed fittingly and movable in the narrow section 122N of the counterbore 122 of the second side seat 12 along the central axis (L2).

In this embodiment, the second braking member 32 and the connecting member 33 of the braking unit 30 are formed as one piece, and may be connected with each other in other ways in other embodiments. The connecting member 33 has a first end 331 proximate to the first side seat 11, a second end 332 opposite to the first end 331, and fixedly connected to the second braking member 32, opposite side edges 333 connected between the first and second ends 331, 332, and a pair of hollow sliding portions 334 disposed respectively on the side edges 333, and respectively and movably sleeved on the guiding members 13. Each of the sliding portions 334 has a through hole 335, and a self-lubricating bearing 336 disposed in the through hole 335. The guiding members 13 of the main body unit 10 respectively extend through the self-lubricating bearings 336.

The actuating unit 40 includes a support 41 fixedly connected to the first end 331 of the connecting member 33, an actuator 42 mounted on the support 41, a bushing 43 disposed on the support 41 in such a manner that movement of the bushing 43 on the support 41 along the central axis (L2) is prevented, and a driving shaft 44 extending along the central axis (L2), and rotated by the actuator 42 to move the first braking member 31 relative to the main body unit 10.

The support 41 is disposed on a side of the first side seat 11 that is distal from the second side seat 12, and has a circular hole 411 extending along the central axis (L2), and two guide holes 412 respectively located at two sides of the circular hole 411, and respectively disposed for engagement with the guide rods 115.

In this embodiment, the actuator 42 is a conventional assembly of a motor and a speed reduction unit, and has a driving portion 421 (see FIG. 5) aligned with the circular hole 411 of the support 41, and operable for driving rotation of the driving shaft 44.

Figure 5:
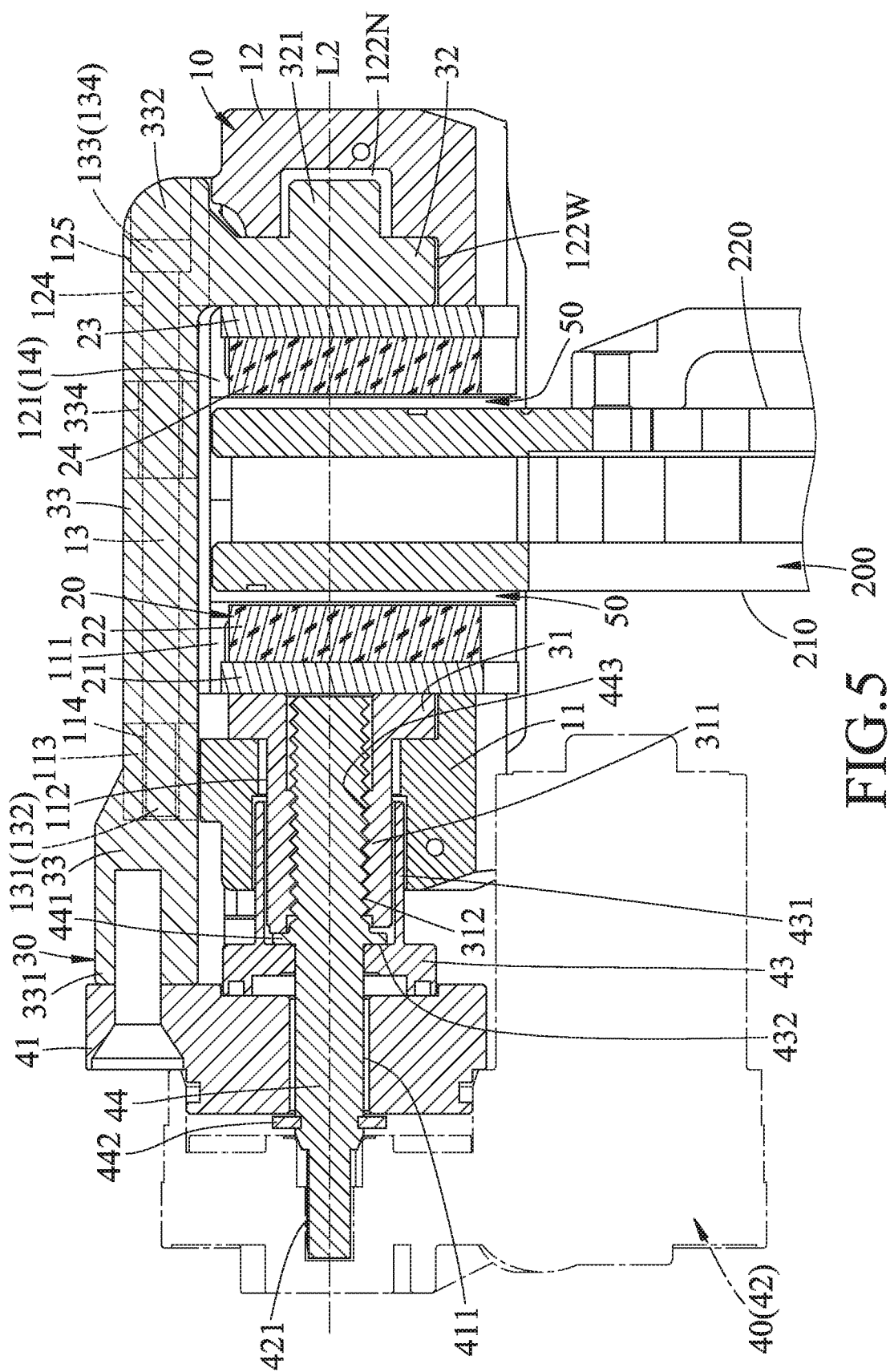
FIG. 5 is a sectional view of the embodiment.

As shown in FIG. 5, the bushing 43 has a hollow sleeve tube portion 431, and a flange 432 disposed adjacent to an end of the sleeve tube portion 431. The extension tube portion 311 of the first braking member 31 extends into the sleeve tube portion 431 of the bushing 43.

The driving shaft. 44 extends rotatably through the bushing 43 and the circular hole 411 of the support 41 along the central axis (L2) such that, through operation of the actuator 42, the first lining 22 is driven by the first braking member 31 to move toward the first side surface 210 in a direction to thereby move the second braking member 32 toward the second side surface 220 in an opposite direction, so that the first and second linings 22, 24 are moved toward each other to clamp the brake disk 200 therebetween. The driving shaft 44 has a flange 441 abutting against the flange 432 of the bushing 43, a C-shaped retaining ring 442 located at one side of the flange 441, and abutting against the support 41, a threaded portion 443 located at the other side of the flange 441, and threadedly engaging the threaded hole 312 of the first braking member 31. In such manner, the flange 432 of the bushing 43 and the support 41 are confined between the flange 441 of the driving shaft 44 and the C-shaped retaining ring 442 so as to prevent movement of the driving shaft 44 relative to the support 41 and the bushing 43.

Figure 2:
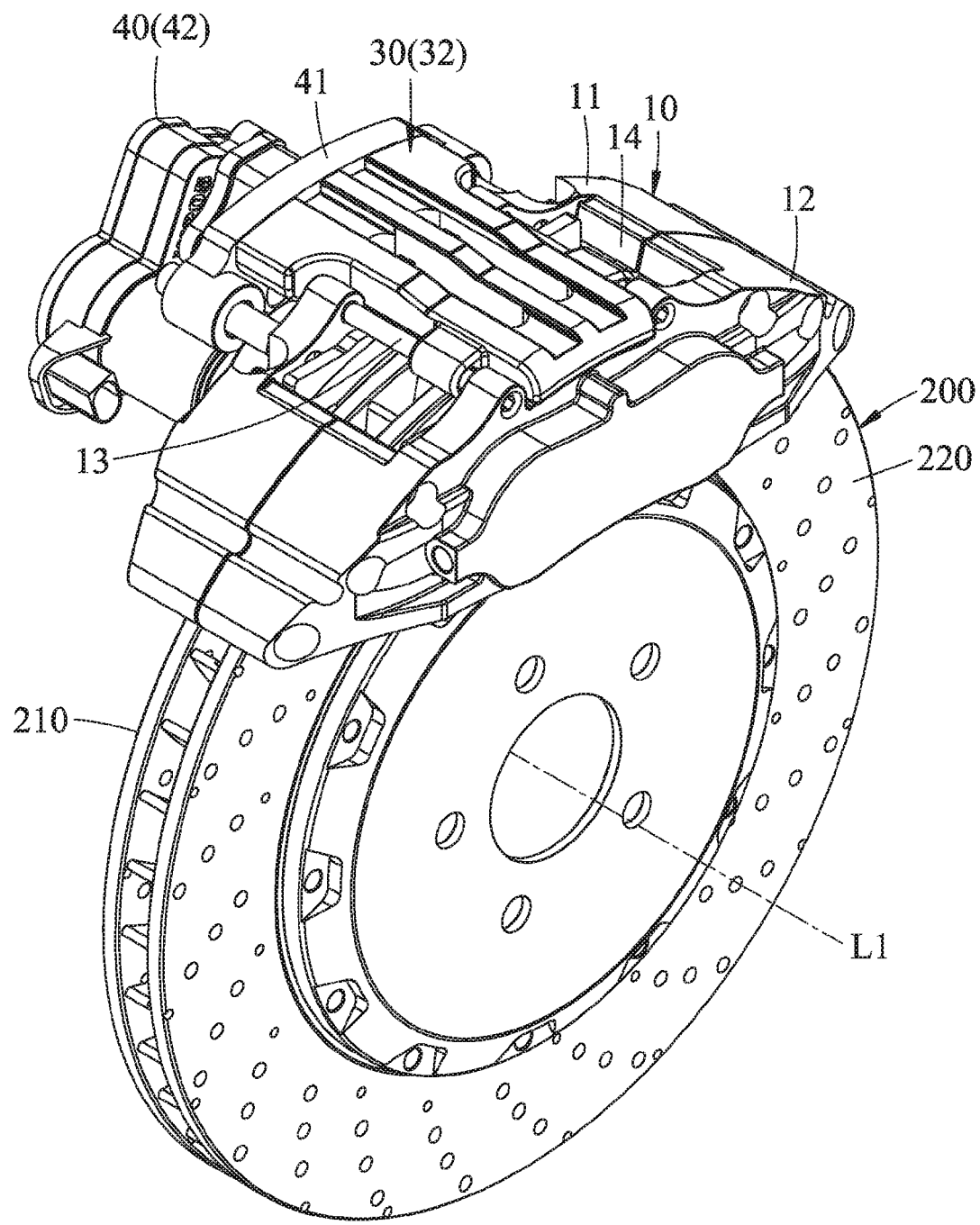
FIG. 2 is another perspective view of the embodiment, with the electric parking brake mounted to the brake disk.
Figure 3:
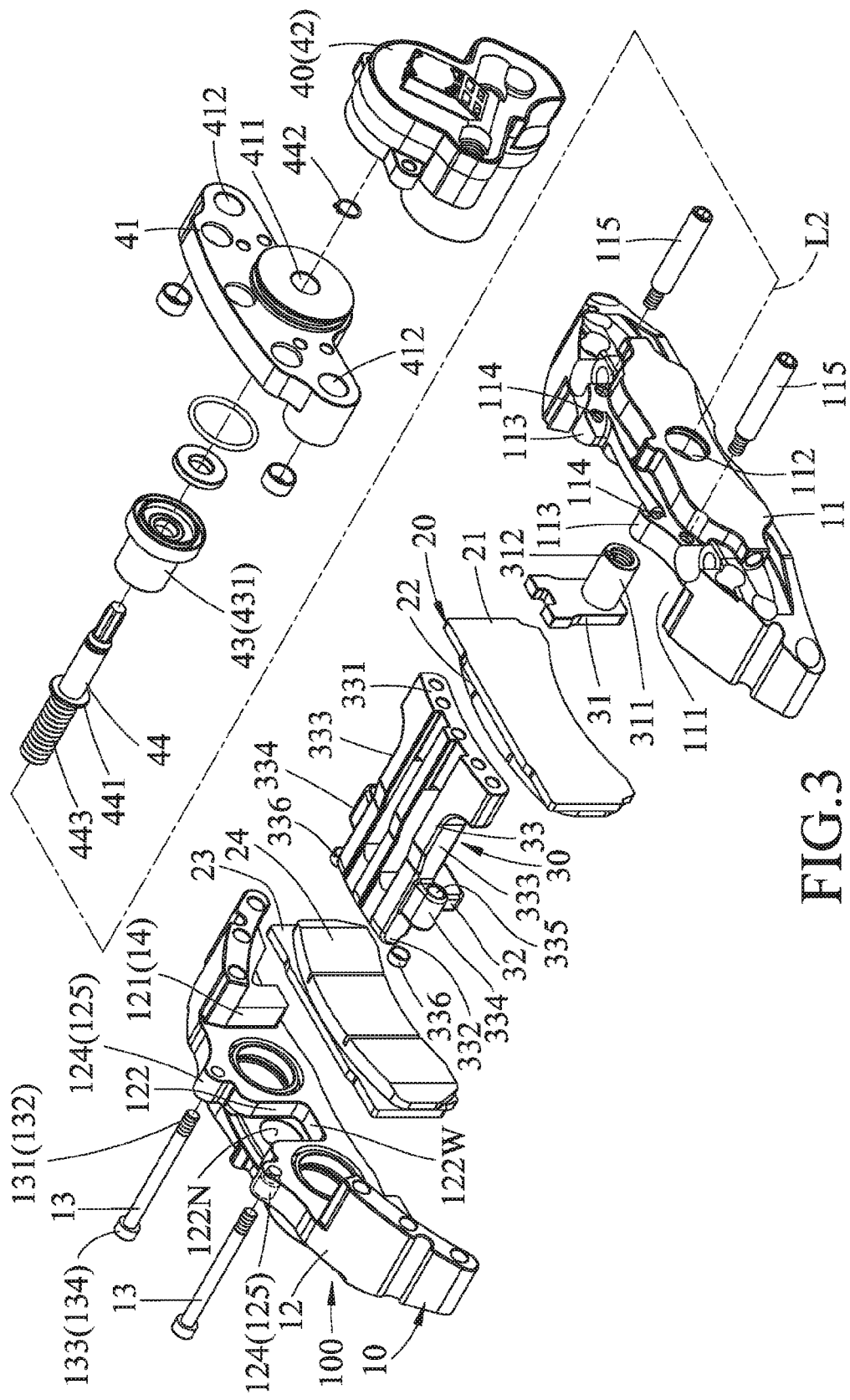
FIG. 3 is a perspective exploded view of the embodiment.
Figure 4:
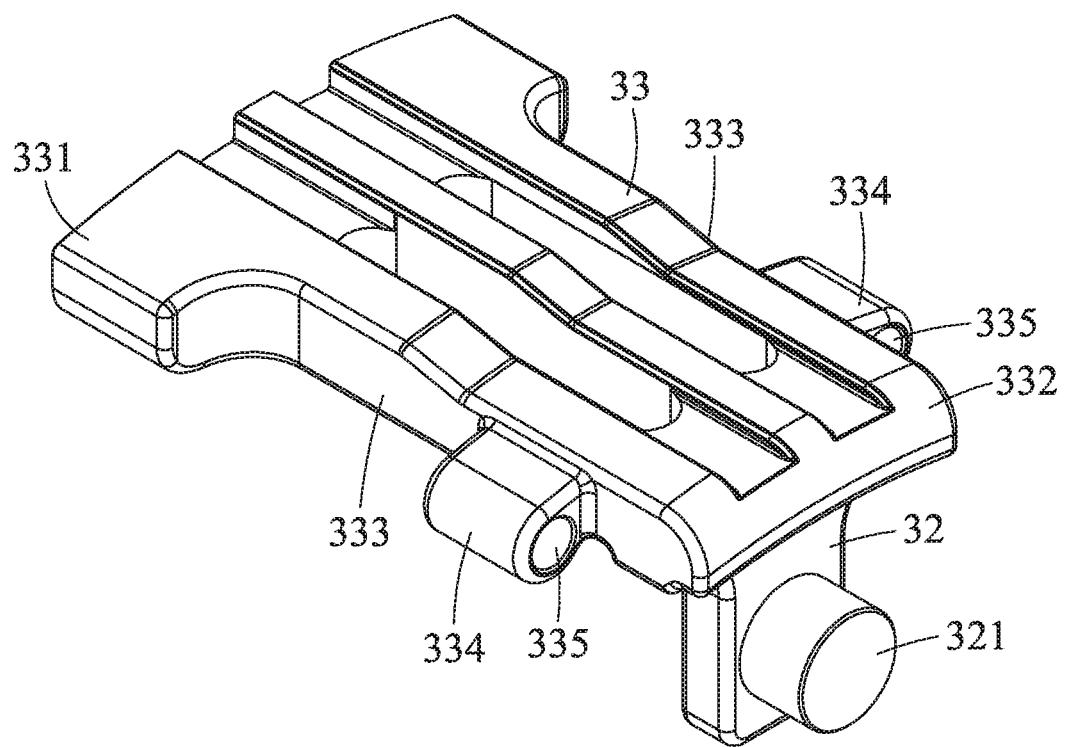
FIG. 4 is a perspective view of a connecting member of the embodiment.

Referring to FIGS. 1, 2 and 5, when the electric parking brake 100 is in an idle state, a clearance 50 is formed between the first lining 22 and the first side surface 210 and between the second lining 24 and the second side surface 220. Hence, rotation of the brake disk 200 is allowed.

Figure 6:
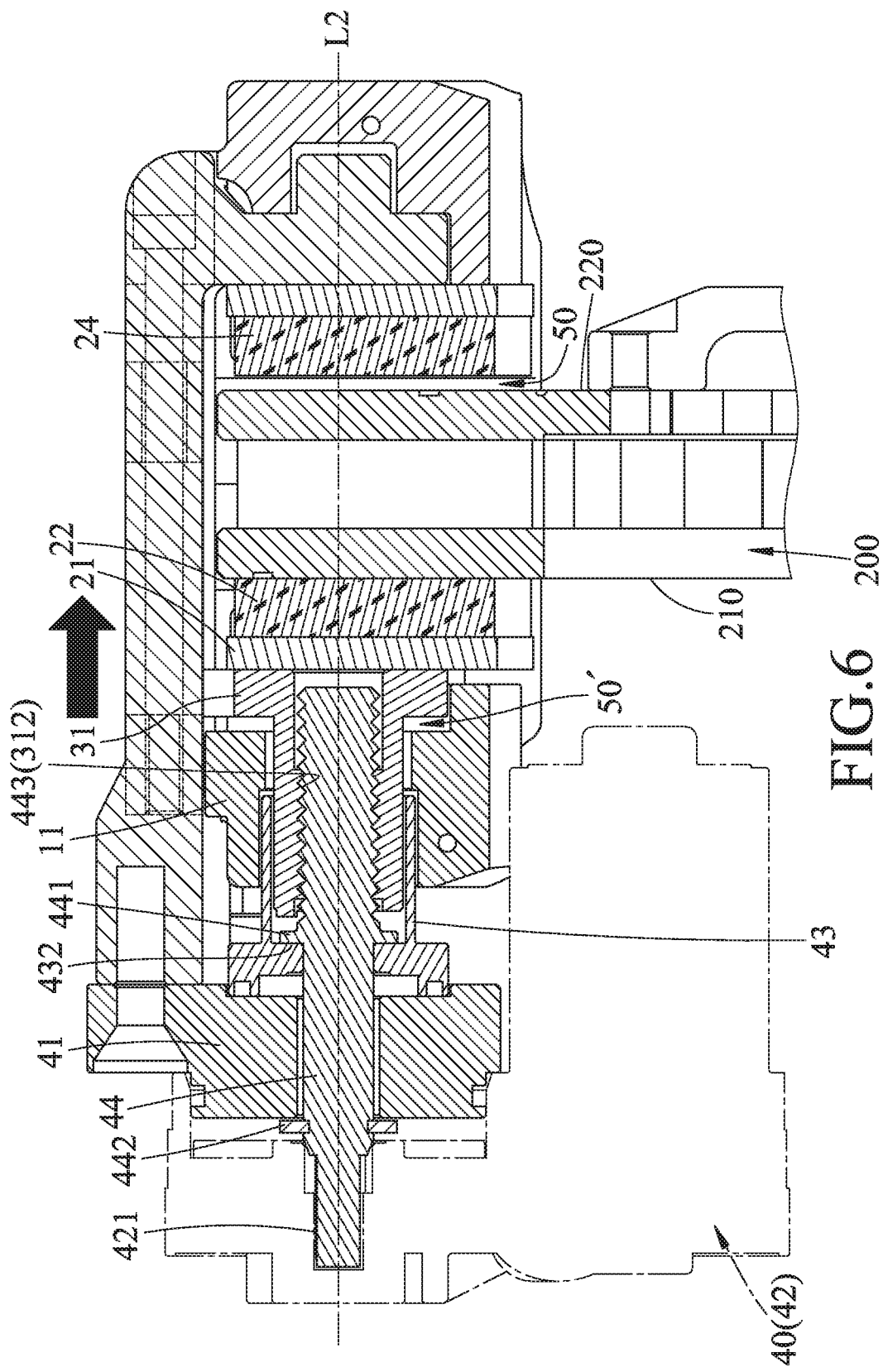
FIG. 6 is a sectional schematic view of the embodiment, illustrating a parking operation.

As shown in FIG. 6, when parking is desired, the actuator 42 of the actuating unit 40 is actuated, so that the driving portion 421 drives rotation of the driving shaft 44 in a forward direction. Due to the disposition of the flange 441 and the C-shaped retaining 442 of the driving shaft 44, and due to engagement between the threaded portion 443 of the driving shaft 44 and the threaded hole 312 of the first braking member 31, the rotation of the driving shaft 44 results in movement of the first braking member 31 along the central axis (L2) toward the brake disk 200. Hence, the first lining 22 is moved together with the first positioning member 21 to contact the first side surface 210. In other words, the clearance 50 between the first lining 22 and the first end surface 210 disappears. At this time, another clearance 50' occurs between the first side seat 11 and the first braking member 31, and the clearance 50 between the second lining 24 and the second side surface 220 remains.

Figure 7:
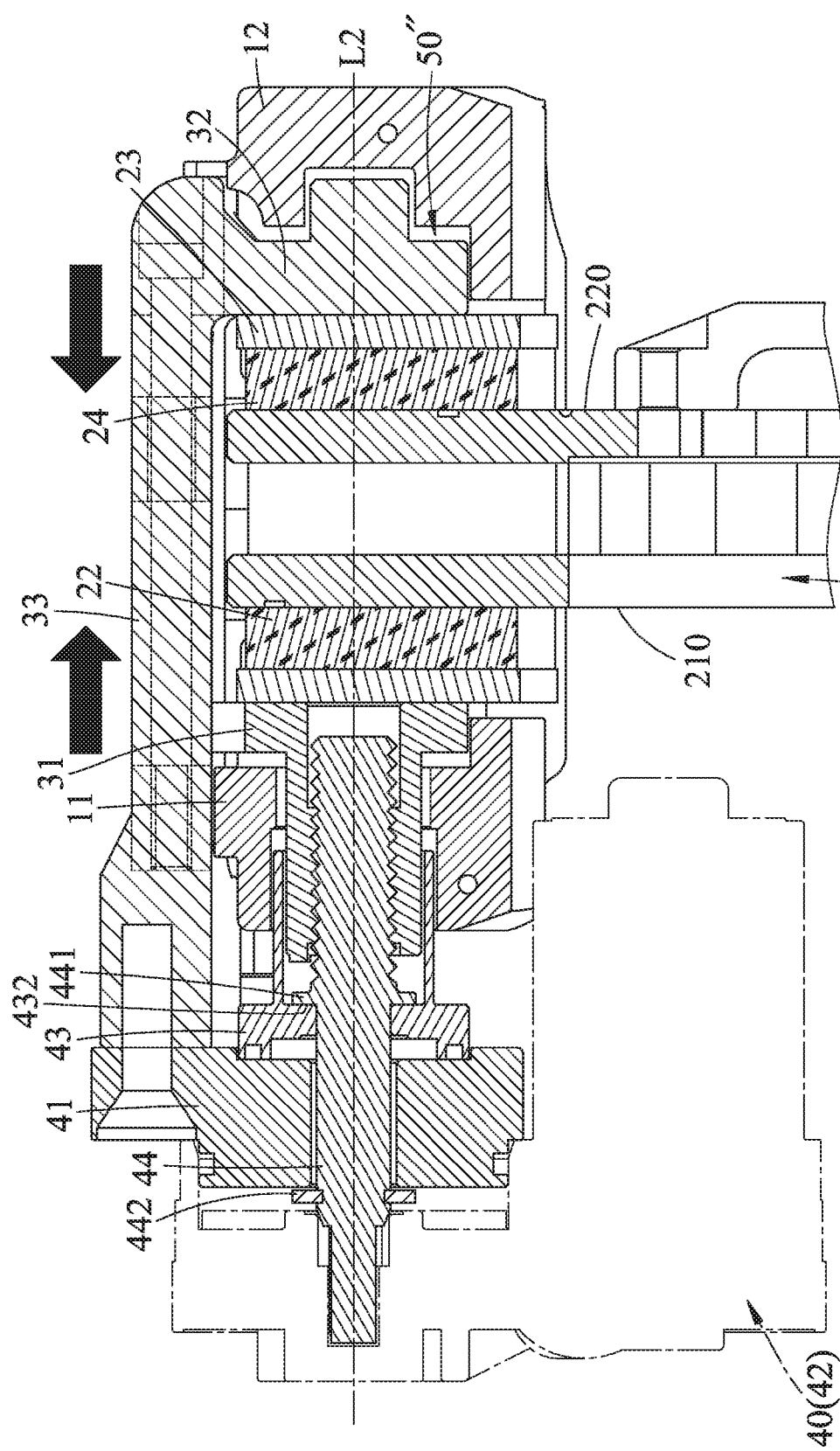
FIG. 7 is a sectional schematic view of the embodiment, illustrating that the parking operation is completed.

As shown in FIG. 7, when the first lining 22 comes into contact with the first side surface 210, since the rotation of the driving shaft 44 is continued, the driving shaft 44 is moved relative to the first braking member 31 in a direction away from the brake disk 200 (i.e., in FIG. 7, in a leftward direction). At the same time, all of the support 41, the bushing 43, the connecting member 33, and the second braking member 32 co-move with the driving shaft 44 along the central axis (L2) by virtue of the guiding action of the guide rods 115 and the guide holes 412 (see FIG. 3), so that the second positioning member 23 moves the second lining 21 to contact the second side surface 220, thereby clamping the brake disk 200 between the first and second linings 22, 24. At this time, the clearance 50 between the second lining 24 and the second side surface 220 disappears, and another clearance 50" occurs between the second side seat 12 and the second braking member 32.

Subsequently, the actuator 42 can be actuated again to drive rotation of the driving shaft 44 in a reverse direction to thereby allow the first and second linings 22, 24 to return from braking, positions shown in FIG. 7 to idle positions shown in FIG. 5. As such, the electric parking brake 100 can be switched between a parking state and the idle state by simply operating the actuator 42.

During the above-mentioned parking operation, with the configuration of the sliding portions 334 and the self-lubricating bearings 336, the connecting member 33 can smoothly and slidably move relative to the guiding members 13, and has limited degrees of freedom of movement. In addition, with the configuration of the protruding rod 321 of the second braking member 32, the second braking member 32 also has limited degrees of freedom of movement. Hence, the braking unit 30 can be prevented from being lifted up when braking suddenly, and the parking stability is increased.

In conclusion, with the configuration of the disclosure, the electric parking brake 100 is convenient to operate, and has better stability when braking suddenly.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electric parking brake adapted for use with a brake disk, the brake disk having a rotating axis, and opposite first and second side surfaces that are perpendicular to the rotating axis, said electric parking brake comprising:

a main body unit including first and second side seats that are adapted to be located respectively at two sides of the brake disk, and that are adapted to be adjacent respectively to the first and second side surfaces, and a pair of elongate guiding members that are spaced apart from each other, and that are connected between said first and second side seats, said first side seat having a first recess that is adapted to be disposed in proximity to the first side surface, said second side seat having a second recess that is adapted to be disposed in proximity to the second side surface, said first and second recesses cooperating to form an accommodating space between said first and second side seats, said guiding members extending parallel to the rotating axis and through said accommodating space;

a lining unit including a first positioning member that is movable in said first recess along a central axis which is parallel to the rotating axis, a first lining that is secured on said first positioning member, a second positioning member that is movable in said second recess along the central axis, and a second lining that is secured on said second positioning member, said first and second linings being adapted to be adjacent respectively to the first and second side surfaces;

a braking unit including a first braking member that is movable in said first recess along the central axis, a second braking member that is movable in said second recess along the central axis, and a connecting member that has opposite side edges, and a pair of hollow sliding portions disposed respectively on said side edges, and respectively and movably sleeved on said guiding members; and an actuating unit including a support that is fixedly connected to said connecting member, an actuator that is mounted on said support, and a driving shaft that extends along the central axis, and that is rotated by said actuator to move said first braking member relative to said main body unit, said driving shaft having a threaded portion that threadedly engages said first braking member such that, through operation of said actuator, said first lining is driven by said first braking member to move toward the first side surface in a direction to thereby move said second braking member toward the second side surface in an opposite direction, so that said first and second linings are moved toward each other to clamp the brake disk therebetween wherein said second braking member and said connecting member of said braking unit are formed as one piece;

wherein said second side seat of said main body unit further has a counterbore having a wide section that is communicated with said second recess, and a narrow section that is narrower than said wide section;

wherein said second said second braking member of said braking unit has a protruding rod; and wherein said second braking member is movable in said counterbore along the central axis, said protruding rod being disposed fittingly and movable in said narrow section of said counterbore along the central axis.

2. The electric parking brake as claimed in claim 1, wherein each of said sliding portions of said braking unit has a through hole, and a self-lubricating bearing disposed in said through hole, said guiding members of said main body unit respectively extending through said self-lubricating bearings of said sliding portions.

3. The electric parking brake as claimed in claim 2, wherein:

each of said guiding members of said main body unit has a first guiding end and a second guiding end, which are opposite to each other;

said first side seat has a pair of first lugs fixedly and respectively connected to said first guiding ends of said guiding members; and said second side seat has a pair of second lugs fixedly and respectively connected to said second guiding ends of said guiding members.

4. The electric parking brake as claimed in claim 3, wherein:
- each of said guiding members of said main body unit further has a threaded section disposed at a respective one of said first guiding ends, and a head section disposed at a corresponding one of said second guiding ends;
- each of said first lugs of said first side seat has a threaded hole threadedly engaged to a corresponding one of said threaded sections of said guiding members; and
- each of said second lugs of said second side seat has a counterbore disposed for receiving a corresponding one of said head sections of said guiding members.

* * * * *